United States Patent [19]

Seima et al.

[11] Patent Number: 4,958,948
[45] Date of Patent: Sep. 25, 1990

[54] SYSTEM FOR DRIVING A BRUSHLESS MOTOR

[75] Inventors: Toshiaki Seima, Yonago; Susumu Yamamoto, Takatsuki; Hiromitsu Nakano, Hirakata, all of Japan

[73] Assignee: Matsushita Electric Industrial Co., Ltd., Osaka, Japan

[21] Appl. No.: 416,538

[22] Filed: Oct. 3, 1989

[30] Foreign Application Priority Data

Oct. 7, 1988 [JP] Japan .................................. 63-254066

[51] Int. Cl.⁵ .............................................. H02D 5/16
[52] U.S. Cl. ..................................... 388/812; 388/911
[58] Field of Search ................................ 388/809-814, 388/819-820, 828-829, 901, 911

[56] References Cited

U.S. PATENT DOCUMENTS

| | | | |
|---|---|---|---|
| 4,015,180 | 3/1977 | Tetsugu et al. | 388/820 |
| 4,211,964 | 7/1980 | Yabu et al. | 388/812 |
| 4,243,921 | 1/1981 | Tamura et al. | 388/812 X |
| 4,511,830 | 4/1985 | Yamada et al. | 388/812 |
| 4,567,409 | 1/1986 | Ogawa | 388/820 |
| 4,617,675 | 10/1986 | Ashikaga et al. | 388/810 X |
| 4,623,827 | 11/1986 | Ito | 388/810 |
| 4,628,460 | 12/1986 | Frederich | 388/810 |

FOREIGN PATENT DOCUMENTS 52-80415 7/1977 Japan .
59-36519 9/1984 Japan .
61-293191 12/1986 Japan .

Primary Examiner—William M. Shoop, Jr.
Assistant Examiner—David Martin
Attorney, Agent, or Firm—Stevens, Davis, Miller & Mosher

[57] ABSTRACT

A system for driving a brushless motor comprises motor drive coils belonging to a plurality of phases respectively, a plurality of pairs of drive transistors connected to the drive coils respectively, a distribution circuit for sequentially distributing drive-coil energization switching signals to the plural drive transistors respectively, a slope synthesizer for smoothing leading and trailing slope portions of the drive-coil energization switching signals so as to apply the smoothed energization switching signals to the drive transistors respectively through the distribution circuit, a voltage-controlled oscillator for supplying a signal having a suitable frequency as an input to the slope synthesizer, a phase error detector for detecting the phase difference between counter-electromotive voltages induced in the drive coils and the drive-coil energization switching signals in a driver-coil energization pause period, and an error amplifier for amplifying the output signal of the phase error detector and applying the amplified phase error signal as an input to the voltage-controlled oscillator.

2 Claims, 14 Drawing Sheets (a)

(b)

(c)

SYSTEM FOR DRIVING A BRUSHLESS MOTOR

BACKGROUND OF THE INVENTION

1. FIELD OF THE INVENTION

This invention relates to a system for driving a brushless motor without the use of a rotor position detector such as a Hall element which detects the position of the rotor of the motor.

2. DESCRIPTION OF THE PRIOR ART

Among various kinds of drive motors, a brushless motor has recently been most frequently employed, because the brushless motor has various advantages including a long useful service life, a high reliability and a decreased size and shape. However, a rotor position detector such as a Hall element is commonly required for detecting the position of the rotor of the brushless motor, and a so-called commutation sensorless brushless motor which does not require such a rotor position detector has been demanded for the purpose of further decreasing the cost, size, etc. of the brushless motor.

A prior art system for driving such a brushless motor is disclosed in, for example, JP-A-52-80415.

The prior art, brushless motor drive system disclosed in the publication cited above will now be described with reference to FIG. 13 which is a circuit diagram of the prior art drive system.

Referring to FIG. 13, drive coils 1, 2 and 3 are common-connected at one end thereof. The drive coil 1 connected at the other end thereof to the anode of a diode 4, to the cathode of a diode 5 and to the collectors of drive transistors 10 and 13. The drive coil 2 is connected at the other end thereof to the anode of a diode 6, to the cathode of a diode 7 and to the collectors of drive transistors 11 and 14. The drive coil 3 is connected at the other end thereof to the anode of a diode 8, to the cathode of a diode 9 and to the collectors of drive transistors 12 and 15. The cathodes of the diodes 4, 6, 8 and the emitters of the drive transistors 10, 11, 12 are connected to a positive power supply line connected to $V_{cc}$, the anodes of the diodes 5, 7, 9 and the emitters of the drive transistors 13, 14, 15 are grounded. The drive coils 1, 2 and 3 are also connected at the other end thereof to a filter circuit 16, and output signals $F_1$, $F_2$ and $F_3$ of the filter circuit 16 are applied to an energization switching circuit 17. Output signals $U_H$, $V_H$, $W_H$, $U_L$, $V_L$ and $W_L$ of the energization switching circuit 17 are applied to the bases of the drive transistors 10 to 15 respectively.

The operation of the prior art brushless motor drive system having the construction described above will now be described with reference to FIG. 14.

In FIG. 14, symbols $U_O$, $V_O$ and $W_O$ designate waveforms of energization signals supplied to the drive coils 1, 2 and 3 respectively. These energization signal waveforms $U_O$, $V_O$ and $W_O$ are supplied to the filter circuit 16 which removes higher harmonics from these waveforms and acts to delay their phases by 90° relative to each other, so that the respective output signals $F_1$, $F_2$ and $F_3$ having waveforms as shown appear from the filter circuit 16. This filter circuit 16 is a primary filter such as, for example, an RC passive filter or a primary Miller integration circuit, and its cut-off frequency is set to be sufficiently low as compared to that of the drive-coil energization signal waveforms. The output signals $F_1$, $F_2$ and $F_3$ of the filter circuit 16 are converted into the signal waveforms $U_H$, $U_L$, $V_H$, $V_L$, $W_H$ and $W_L$ by logical processing in the energization switching circuit 17, and these signal waveforms $U_H$, $U_V$, $V_H$, $V_L$, $W_H$ and $W_L$ are used for switching the drive transistors 10 to 15. In this case, the switching operation of these drive transistors 10 to 15 is such that the motor drive torque is always produced in one direction only thereby rotating the brushless motor in that direction.

However, in the prior art drive system described above, the filter circuit 16 is required to have low-range cut-off frequency characteristics for the individual phases of the drive coils 1 to 3. Therefore, many capacitors having large capacity are required.

Also when the drive coils have large inductance, there is a tendency of occurrence of so-called armature reaction in which, after the drive transistors 10 to 15 are turned on, energization currents for energizing the drive coils 1 to 3 are supplied with a delay time.

In such a case, it is known that the efficiency is lowered when the drive coils 1 to 3 are energized with the timing shown in FIG. 14. With a view to improving the lowered efficiency described above, JP-A-52-80415 cited already proposes a method in which the phases of the output signals $F_1$, $F_2$ and $F_3$ of the filter circuit 16 are somewhat advanced so as to operate the drive transistors 10 to 15 with such advanced phases thereby compensating the delayed energization attributable to the armature reaction. However, parts including additional capacitors are further required so as to effect such compensation. Further, because the drive-coil energization signal waveforms $U_O$, $V_O$ and $W_O$ include spike noise generated at the turned-off time of each of the drive transistors 10 to 15 in addition to current variations due to power supply voltage variations and load variations, it is frequently difficult to accurately derive the energization switching signals $U_H$ to $W_L$ from the drive-coil energization signal waveforms $U_O$, $V_O$ and $W_O$ by the use of the filter circuit 16. With a view to dealing with such a difficulty, a method as disclosed in Japanese Patent Publication No. 59-36519 was proposed.

However, the method of deriving the energization switching signals from the drive-coil energization signal waveforms by the use of the filter circuit has basically a problem as pointed out now. That is, a voltage drop due to the supply of the energization currents during energization of the drive coils and a voltage drop due to the internal impedance of the drive coils, as well as spike noise generated immediately after cessation of the drive-coil energization, are superposed on the fundamental wave (the counter-electromotive voltage) of the drive-coil energization signal waveforms, and these factors incessantly fluctuate with power supply voltage variations and load variations. Therefore, when the drive-coil energization signal waveforms are filtered to obtain the energization switching signals, there occurs an error attributable to the above-described factors superposed on the fundamental wave (the counter-electromotive voltage) of the drive-coil energization signal waveforms while incessantly fluctuating, resulting in difficulty of accurate energization of the drive coils.

Various methods have hitherto been proposed so as to solve the problem pointed out above thereby providing energization switching signals that can effect accurate energization of the drive coils. These prior art methods are basically such that the filter circuit and associated parts are suitably adjusted so as to maintain a fixed phase difference between the counter-electromotive voltages induced in the drive coils and the energization switching signals. However, this adjustment is very troublesome and time-consuming. Further, many capacitors are additionally required besides those constituting the filter circuit. Therefore, when it is desired to use the filter circuit and associated parts to form an integrated circuit, an increased number of externally mounted parts and pins are required, resulting in an expensive IC. On the other hand, JP-A-61-293191 describes a method in which the filter circuit is eliminated, and a microcomputer is used for digital processing so as to provide the desired energization switching signals. However, the disclosed arrangement is also expensive.

It will thus be seen that, in the prior art, brushless motor drive systems, energization switching signals having a fixed phase relative to the position of the rotor of the motor are derived by a filter circuit from drive-coil energization signal waveforms, and such energization switching signals are utilized to successively energize the drive coils. Therefore, it is difficult to produce accurate energization switching signals due to adverse effects including spike noise contained in the drive-coil energization signal wave-forms, a voltage drop across the drive coils due to flow of energization currents, fluctuations of those superposed factors due to power supply voltage variations and load variations, and armature reaction. Further, many capacitors having a large capacity are required to constitute the filter circuit. This is disadvantageous from the aspect of costs especially when the filter circuit and its associated parts are used to form an IC, because an increased number of externally mounted parts and pins are required.

Further, when the energization switching pulse signals are supplied so as to selectively energize the drive coils, noise (referred to hereinafter as electromagnetic noise) is generated due to attraction and repulsion between the rotor magnet and the stator coils. Thus, the prior art brushless motor drive systems had various problems as pointed out hereinbefore.

SUMMARY OF THE INVENTION

With a view to solving the prior art problems described above, it is an object of the present invention to provide a novel system for driving a brushless motor, in which energization switching signals for switching over energization of drive coils of the motor are produced without the use of a filter circuit, thereby eliminating many large-capacity capacitors required hitherto to constitute the filter circuit and, at the same time, obviating an adverse effect attributable to spike noise contained in drive-coil energization signal waveforms, an adverse effect attributable to power supply voltage variations and load variations, as well as an adverse effect attributable to armature reaction, and in which drive transistors are sequentially smoothly turned on and off, thereby capable of driving the motor at a minimized level of electromagnetic noise.

In accordance with the present invention, there is provided a system for driving a brushless motor comprising motor drive coils belonging to a plurality of phases respectively, a plurality of pairs of drive transistors connected to the drive coils respectively, a distribution circuit sequentially distributing drive-coil energization switching signals to the plural drive transistors respectively, a slope synthesizer for smoothing leading and trailing slope portions of the drive-coil energization switching signals so as to apply the smoothed energization switching signals to the drive transistors respectively through the distribution circuit, a voltage-controlled oscillator for applying a signal having a suitable frequency as an input to the slope synthesizer, and a phase error detector for detecting the phase difference between counter-electromotive voltages induced in the drive coils and the drive-coil energization switching signals in a drive-coil energization pause period, the phase error detector applying its output signal as an input to the voltage-controlled oscillator.

In the brushless motor drive system of the present invention having the above-described construction, the phase difference between the counter-electromotive voltages induced in the motor drive coils and the drive-coil energization switching signals is detected so as to control the energization switching signals having a trapezoidal waveform synthesized according to the detected phase difference. In other words, a feedback loop, that is, a phase-locked control loop (PLL loop) is provided so that the energization switching signals having the trapezoidal waveform can maintain a fixed relationship with respect to the position and rotation speed of the rotor of the brushless motor. Accordingly, the present invention obviates all of various prior art disadvantages attributable to the presence of the filter circuit required hitherto. Further, even when the rotation speed of the brushless motor changes, there occurs no change in the electrical angle of the slope portions of the energization switching signals having the trapezoidal waveform. That is, when the rotation speed of the brushless motor is low, the slope portions have a moderate angle or gradient and last for a relatively long period of time, while when the motor rotation speed is high, the slope portions have a steep angle or gradient and last for a relatively short period of time. Since thus the angle or gradient of the slope portions is controlled according to the rotation speed of the motor, minimized electromagnetic noise is generated until the motor rotates at its steady rotation speed after it is started.

DESCRIPTION OF THE PREFERRED EMBODIMENTS

Preferred embodiments of the brushless motor drive system according to the present invention will now be described in detail with reference to FIGS. 1 to 12.

Figure 1:
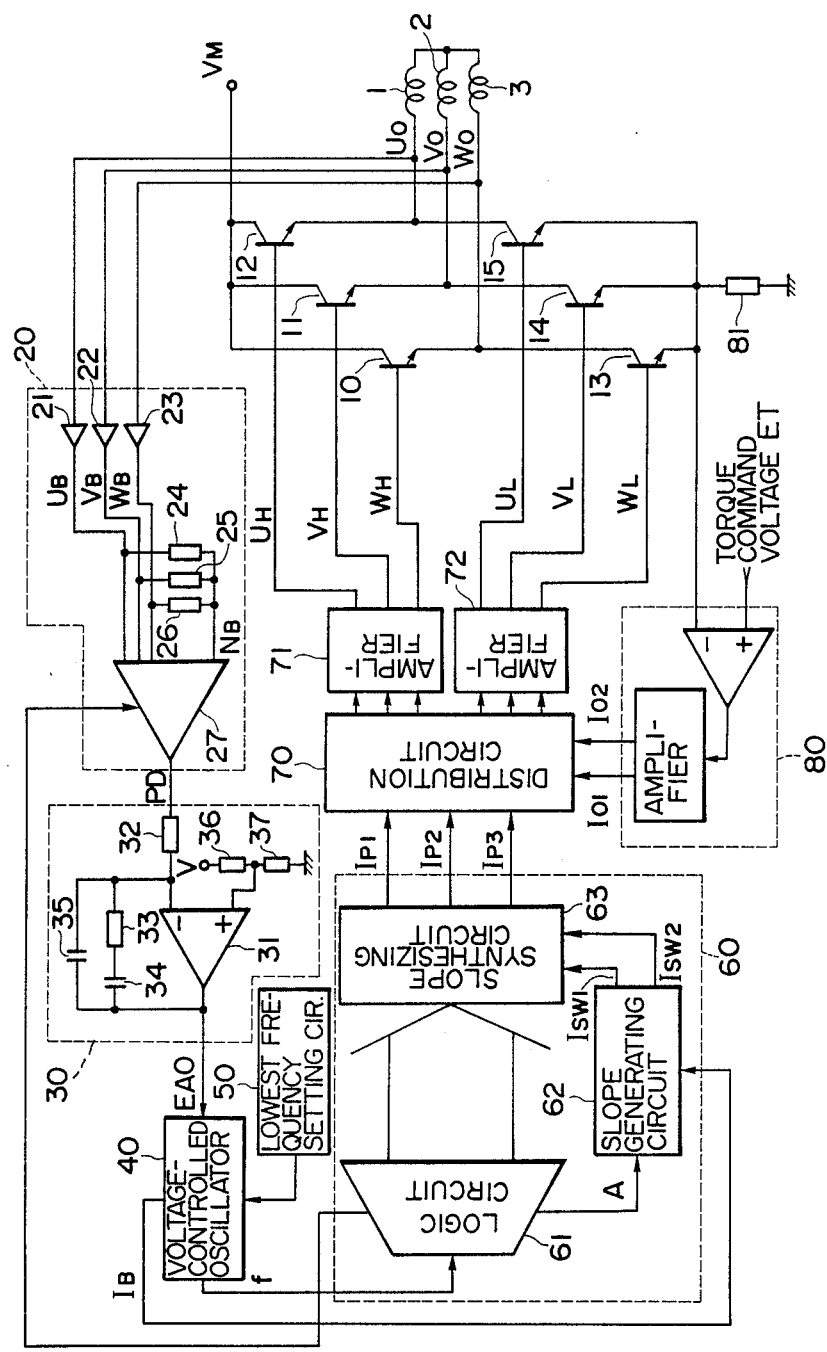
FIG. 1 is an overall block circuit diagram showing the construction of a preferred embodiment of the brushless motor drive system according to the present invention.
Figure 13:
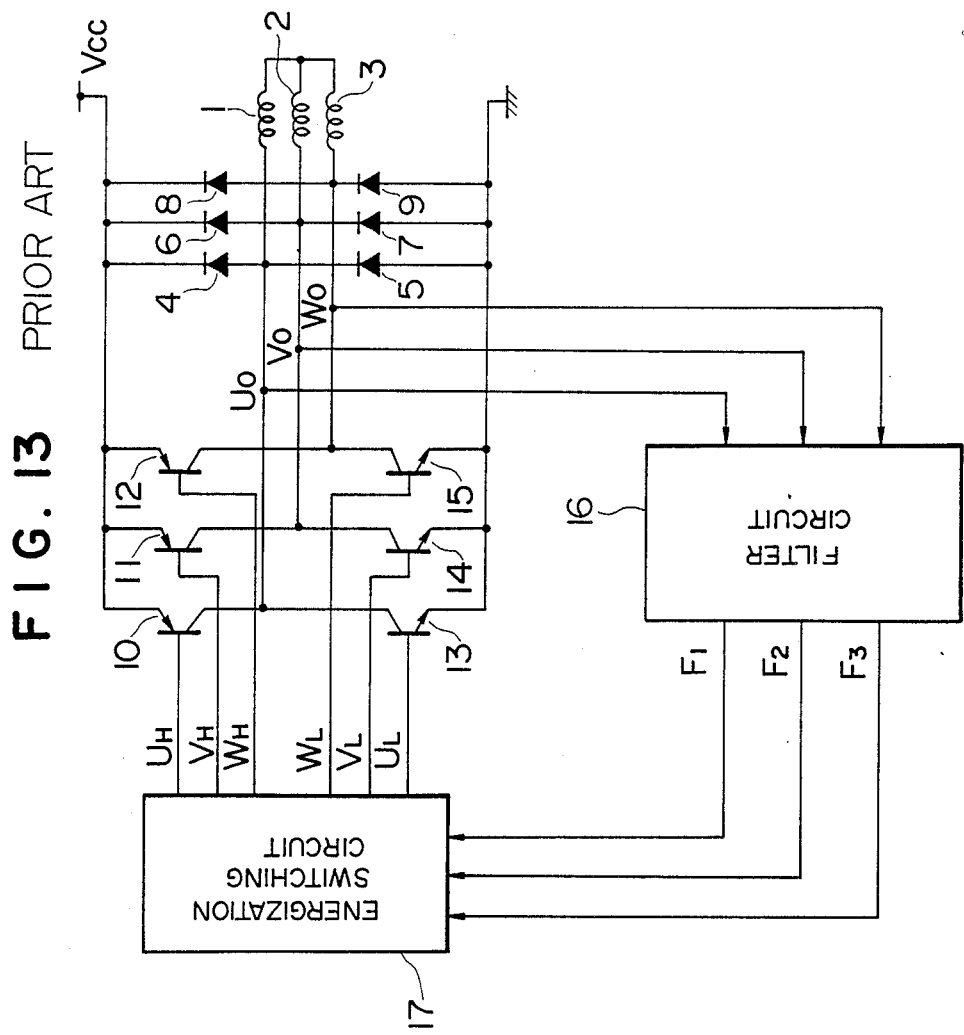
FIG. 13 is a block circuit diagram showing the construction of a prior art brushless motor drive system.
Figure 14:
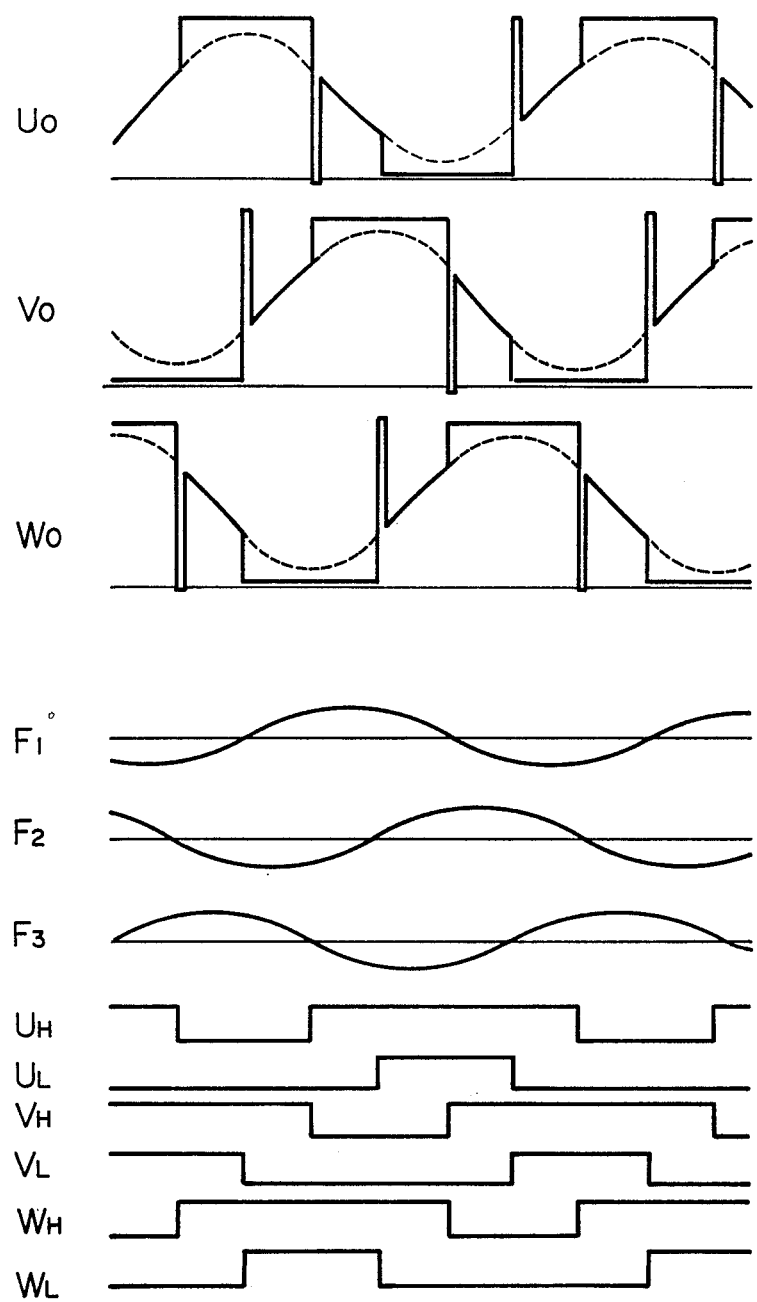
FIG. 14 illustrates the operation of the prior art drive system shown in FIG. 13.

FIG. 1 is an overall block circuit diagram showing the construction of a preferred embodiment of the brushless motor drive system according to the present invention. In FIG. 1, like reference numerals are used to designate like functional parts appearing in FIG. 13 showing a prior art brushless motor drive system so as to dispense with repeated description of such parts.

Referring to FIG. 1, drive transistors 10, 11 and 12 are connected at their bases to respective output terminals of a first amplifier 71, and drive transistors 13, 14 and 15 are also connected at their bases to respective output terminals of a second amplifier 72. The first and second amplifiers 71 and 72 are connected at their input terminals to respective output terminals of a distribution circuit 70, and the distribution circuit 70 is connected at its input terminals to respective output terminals of a slope synthesizing circuit 63 and to those of a speed error amplifier 80. A torque command voltage ET is externally applied to a non-inverting input terminal of the speed error amplifier 80. The speed error amplifier 80 is connected in common at its inverting input terminal to the emitters of the drive transistors 13 to 15 and to one terminal of a resistor 81 which is grounded at its other terminal. The slope synthesizing circuit 63 is connected at its input terminals to respective output terminals of a logic circuit 61 and to those of a slope generating circuit 62. The slope generating circuit 62 is connected at its input terminals to an output A of the logic circuit 61 and to an output IB of a voltage-controlled oscillator 40. The logic circuit 61 is connected at its input terminal to an output f of the voltage-controlled oscillator 40. The combination of the slope synthesizing circuit 63, the slope generating circuit 62 and the logic circuit 61 constitutes a slope synthesizer 60.

The voltage-controlled oscillator 40 is connected at its input terminals to an output of a lowest frequency setting circuit 50 and to an output EAO of an operational amplifier 31. A series circuit consisting of a resistor 33 and a capacitor 34 is connected together with another capacitor 35 between an inverting input terminal and an output terminal of the operational amplifier 31. A predetermined bias voltage is applied by resistors 36 and 37 to a non-inverting input terminal of the operational amplifier 31, and the inverting input terminal of the operational amplifier 31 is connected through a resistor 32 to an output PD of a comparator 27. The combination of the components 31 to 37 described above constitutes an error amplifier 30.

Energization voltage signals $U_O$, $V_O$ appearing at one side ends of drive coils 1, 2 and 3 respectively, are supplied to input terminals of buffer circuits 21, 22 and 23 respectively. Output signals $U_B$, $V_B$ and $W_B$ of these buffer circuits 21, 22 and 23 are connected to respective input terminals of a comparator 27 and are also applied to a common connection point $N_B$ through respective resistors 24, 25 and 26. The common connection point $N_B$ is connected to the other input terminal of the comparator 27.

The operation of the brushless motor drive system having the above-described construction will now be described in detail.

Figure 2:
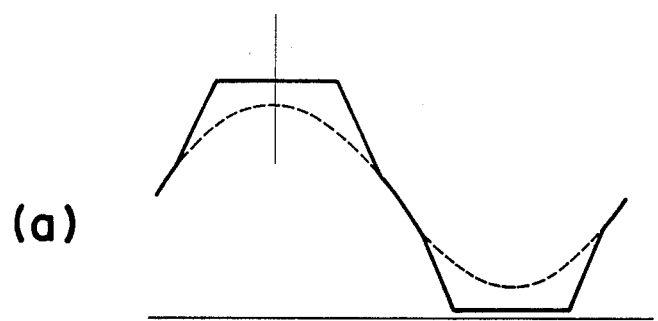
FIG. 2 illustrates the basic principle of the operation of the drive system shown in FIG. 1.
Figure 2:
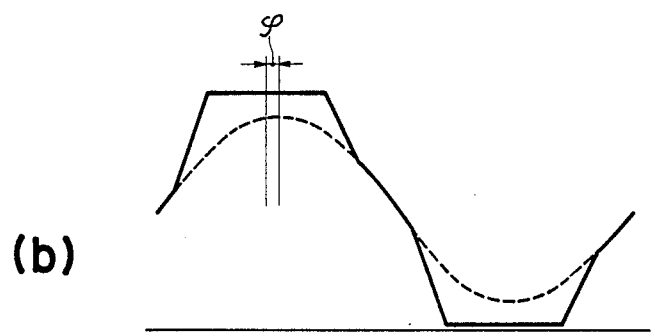
Figure 2:
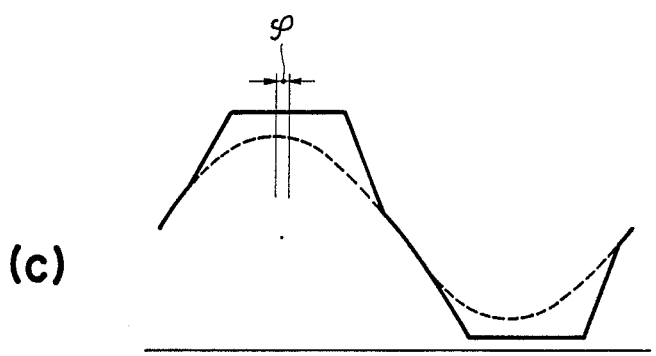

FIG. 2 illustrates the basic principle of the operation of the brushless motor drive system of the present invention. That is, FIG. 2 shows the relation between the phase of a counter-electromotive voltage waveform induced in one of the drive coils and that of the energization signal waveform supplied to that drive coil. FIG. 2(a) shows that the relation between the phase of the counter-electromotive voltage waveform indicated by the broken curve and that of the drive-coil energization signal waveform indicated by the solid curve is optimum. On the other hand, FIGS. 2(b) and 2(c) show that the phases of these two wave-forms deviate from each other by a phase angle $\psi$, that is, the phase relation is not optimum.

Referring to FIG. 1 again, the output signal f of the voltage-controlled oscillator 40 is transmitted to the drive coils 1 to 3 through the slope synthesizer 60, the distribution circuit 70 and the drive transistors 10 to 15. Therefore, there is a fixed phase relation between the waveform of the output signal f of the voltage-controlled oscillator 40 and the energization signal waveforms supplied to the drive coils 1 to 3. Thus, by suitably controlling the oscillation frequency and phase of the waveform of the output signal f of the voltage-controlled oscillator 40, the phase difference between the counter-electromotive voltage waveforms induced in the drive coils 1 to 3 and the drive-coil energization signal waveforms can be controlled. Therefore, when the phase difference represented by the phase angle $\psi$ occurs between the drive-coil counter-electromotive voltage waveform and the drive-coil energization signal waveform as shown in FIG. 2(b) or 2(c), that phase error $\psi$ is detected by the phase error detector 20 and amplified by the error amplifier 30. Thus, by the provision of the phase control loop for controlling the oscillation frequency and phase of the output signal f of the voltage-controlled oscillator 40 thereby cancelling the phase error $\psi$, the state of optimized energization as shown in FIG. 2(a) can be assured, and the brushless motor can be driven under the optimum condition.

Figure 3:
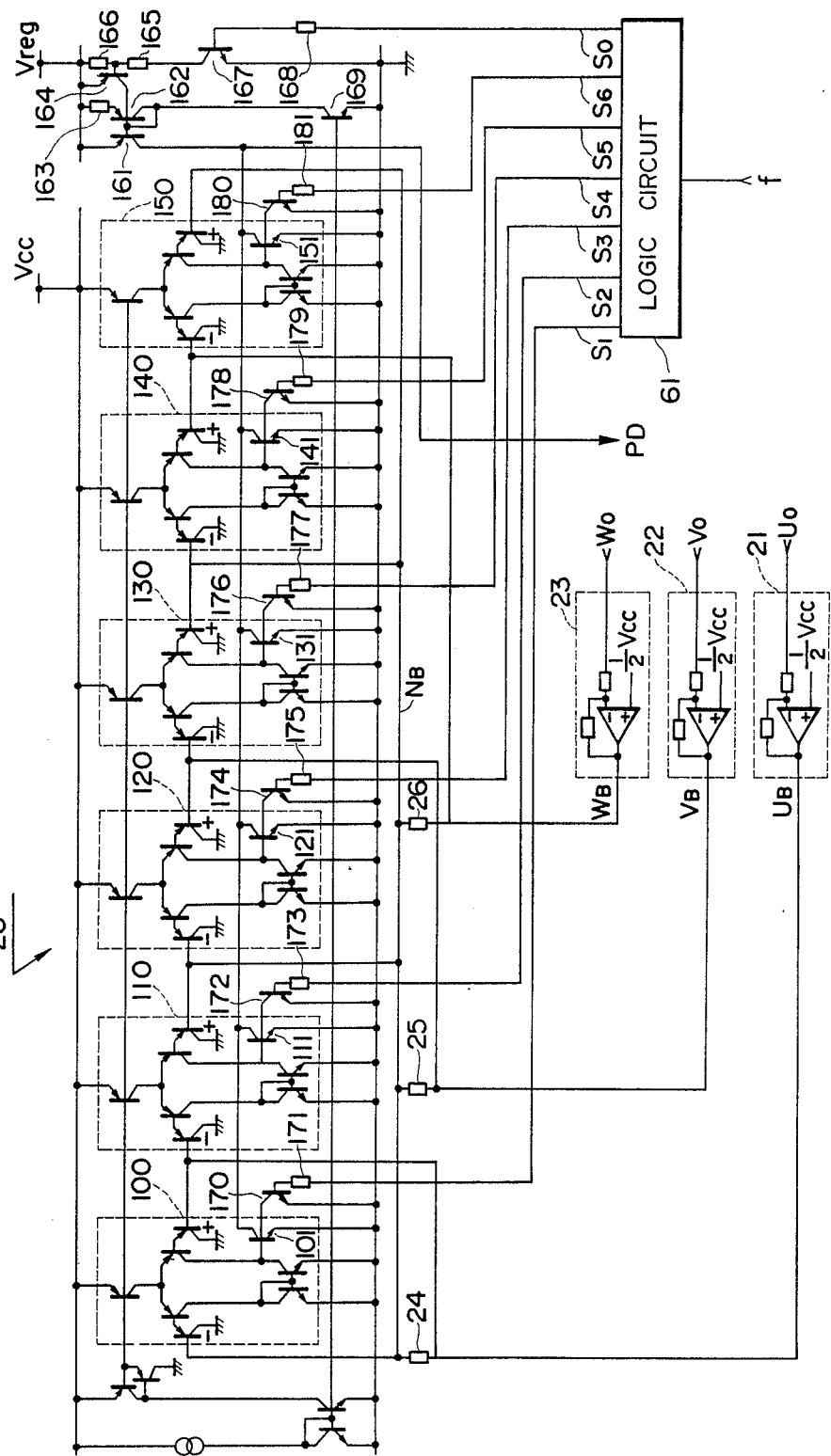
FIG. 3 is a circuit diagram showing the detailed structure of the phase error detector shown in FIG. 1.

FIG. 3 shows, for example, a preferred practical structure of the phase error detector 20. In FIG. 3, the same reference numerals are used to designate the same functional parts appearing in FIG. 1.

Referring to FIG. 3, the energization signal waveforms $U_o$, $V_o$ and $W_o$ at respective one ends of the drive coils 1, 2 and 3 are also supplied to the buffer circuits 21, 22 and 23 respectively. Output terminals generating the output signals $U_B$, $V_B$ and $W_B$ from the buffer circuits 21, 22 and 23 are common-connected at the point $N_B$ through the resistors 24, 25 and 26 respectively. The common connection point $N_B$ is connected to inverting input terminals of comparison circuits 100, 120 and 140 and also to non-inverting input terminals of comparison circuits 110, 130 and 150. The output signal $U_B$ of the buffer circuit 21 is connected to the non-inverting input terminal of the comparison circuit 100 and to the inverting input terminal of the comparison circuit 110. The output signal $V_B$ of the buffer circuit 22 is connected to the non-inverting input terminal of the comparison circuit 120 and to the inverting input terminal of the comparison circuit 130. The output signal $W_B$ of the buffer circuit 23 is connected to the non-inverting input terminal of the comparison circuit 140 and to the inverting input terminal of the comparison circuit 150.

Output signals of the comparison circuits 100, 110, 120, 130, 140 and 150 appear as open-collector output signals of transistors 101, 111, 121, 131, 141 and 151 respectively, and these transistors 101, 111, 121, 131, 141 and 151 are common-connected at their collectors to the collector of a transistor 161 to provide the output signal PD of the phase error detector 20. The transistor 161 is connected at its base to the base and collector of a transistor 162. The transistor 161 is also connected at its base to the collector of a transistor 164 and to the collector of a transistor 169 acting as a constant current source. A stabilized or regulated power supply voltage $V_{reg}$ is applied through a resistor 163 to the emitter of the transistor 162 and is also applied directly to the emitters of the transistors 161 and 164. The transistor 164 is connected at its base to its emitter through a resistor 166 and also to the collector of a transistor 167 through a resistor 165. The transistor 167 is grounded at its emitter. The logic circuit 61 has an output terminal $S_0$ which is connected to the base of the transistor 167 through a resistor 168. The logic circuit 61 has other output terminals $S_1$, $S_2$, $S_3$, $S_4$, $S_5$ and $S_6$ which are connected through resistors 171, 173, 175, 177, 179 and 181 to the bases of transistors 170, 172, 174, 176, 178 and 180 respectively. These transistors 170, 172, 174, 176, 178 and 180 are grounded at their emitters and are connected at their collectors to the bases of the transistors 101, 111, 121, 131, 141 and 151 respectively.

The operation of the phase error detector 20 having the above-described structure will now be described with reference to FIG. 4.

Figure 4:
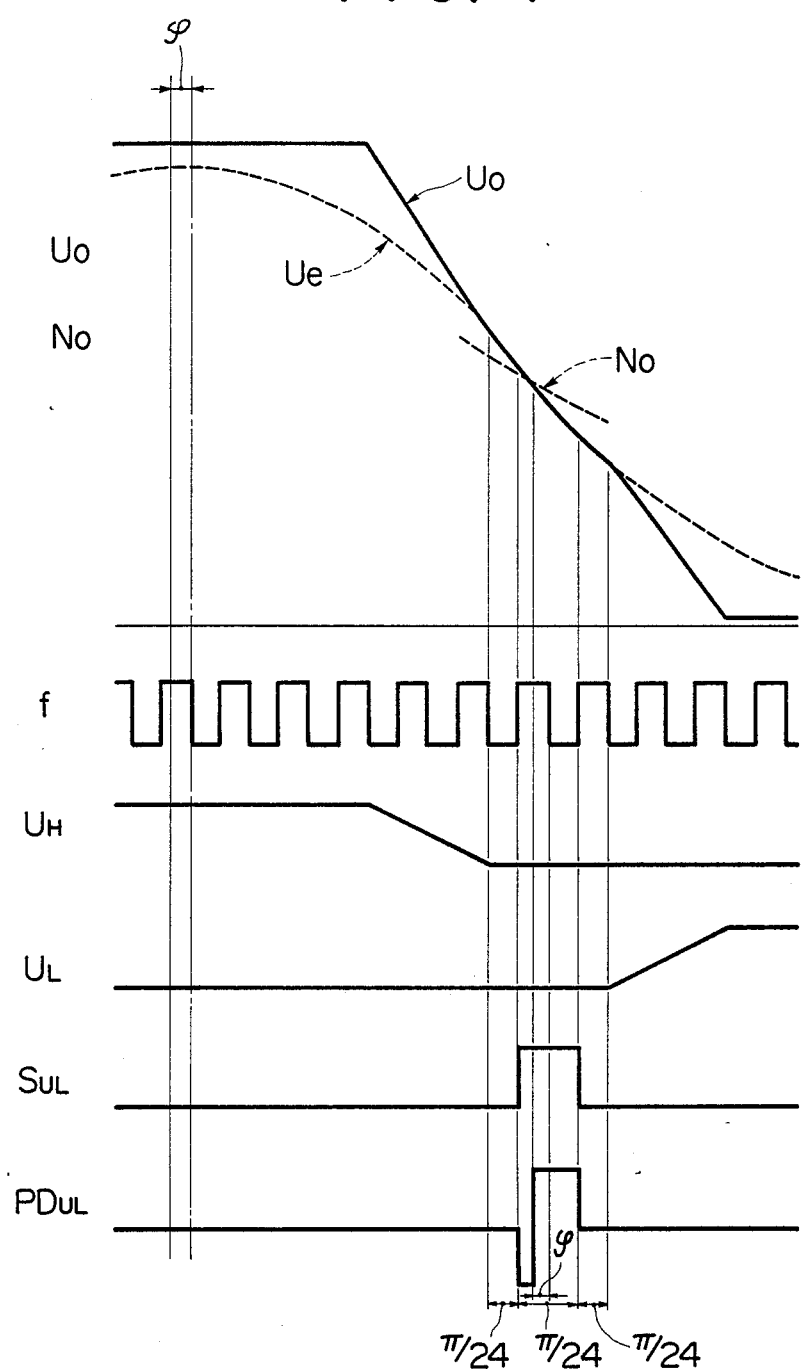
FIG. 4 illustrates the operation of the phase error detector shown in FIG. 3.

FIG. 4, which illustrates the operation of the phase error detector 20, shows how to detect a phase error between a counter-electromotive voltage $U_e$ induced in the drive coil 1 and the drive-coil energization signal waveform $U_o$.

Referring to FIGS. 1, 3 and 4, the drive coil 1 is energized under the command of signals $U_H$ and $U_L$ which are synchronized with the output signal f of the voltage-controlled oscillator 40. Therefore, the period of time in which both of these signals $U_H$ and $U_L$ are not generated is an energization pause period, and, during this period, the drive-coil energization signal waveform $U_o$ coincides with the waveform of the counter-electromotive voltage $U_e$. In FIG. 4, this energization pause period ranges from the time at which the signal $U_H$ is turned into its low level to the time at which the signal $U_L$ starts to rise to its high level, and the length of this energization pause period corresponds to the two clock periods of the output signal f of the voltage-controlled oscillator 40. Such an energization pause period also exists between the time at which the signal $U_L$ is turned into its low level and the time at which the signal $U_H$ starts to rise to its high level. However, for the purpose of simplifying the description, the former pause period will only be considered herein.

Now, a neutral voltage $N_o$ of the drive coil 1 in the energization pause period will be compared with the drive-coil energization signal waveform $U_o$. When the phase difference $\psi$ between the drive-coil energization signal waveform $U_o$ and the counter-electromotive voltage $U_e$ induced in the drive coil 1 is zero, the neutral voltage $N_o$ coincides with the signal waveform $U_o$ at the middle of the energization pause period, that is, at the time later by the one clock period of the signal f after the signal $U_H$ is turned into its low level. Further, when the phase of the signal waveform $U_o$ lags that of the neutral voltage $N_o$ to provide the phase difference $\psi$ therebetween, the voltage $N_o$ coincides with the signal waveform $U_o$ at the time earlier by the one clock period of the signal f after the signal $U_H$ is turned into its low level. On the other hand, when the phase of the signal waveform $U_o$ leads that of the voltage $U_e$ to provide the phase difference $\psi$ therebetween, the voltage $N_o$ coincides with the signal waveform $U_o$ at the time later by the one clock period of the signal f after the signal $U_L$ is turned into its low level. Accordingly, the relation between the phase of the signal waveform $U_o$ and that of the voltage $U_e$ can be determined by comparing the voltage $N_o$ with the signal waveform $U_o$ at the time later by the one clock period of the signal f after the signal $U_H$ is turned into its low level.

Therefore, a preferred method for detecting the phase difference $\psi$ includes generating a phase error detection pulse signal $S_{UL}$ having a suitable pulse width on the basis of the time later by the one clock period of the signal f after the signal $U_H$ is turned into its low level, and comparing the voltage $N_o$ with the signal waveform $U_o$ only when the signal $S_{UL}$ is generated. Thus, a comparator output signal $PD_{UL}$ having a duty factor corresponding to the detected phase difference $\psi$ can be obtained. FIG. 4 shows the case where the signal $S_{UL}$ appears during a $\pm \frac{1}{2}$ clock period of the signal f on the basis of the time later by the one clock period of the signal f after the signal $U_H$ is turned into its low level, and the phase of the signal waveform $U_o$ leads that of the voltage $U_e$ to provide the phase difference $\psi$ therebetween.

The above description refers to the basic principle of the present invention in which the energization pause period ranging between the time of turning the signal $U_H$ into its low level and the time of turning the signal $U_L$ into its high level is utilized to detect the phase difference $\psi$ between the energization signal waveform $U_o$ supplied to the drive coil 1 and the counter-electromotive voltage $U_e$ induced in the drive coil 1. However, the phase difference $\psi$ between the signal waveform $U_o$ and the voltage $U_e$ can be similarly detected utilizing the other energization pause period, that is, the period ranging between the time of turning the signal $U_L$ into its low level and the time of turning the signal $U_H$ into its high level. It is also apparent that the above phase difference $\psi$ can be similarly detected for each of the energization signal waveforms $V_o$ and $W_o$ supplied to the other drive coils 2 and 3 respectively. In the illustrated embodiment, all of the comparator output signals $PD_{UL}$ are combined or added together to provide the output signal PD of the phase error detector 20.

Figure 5:
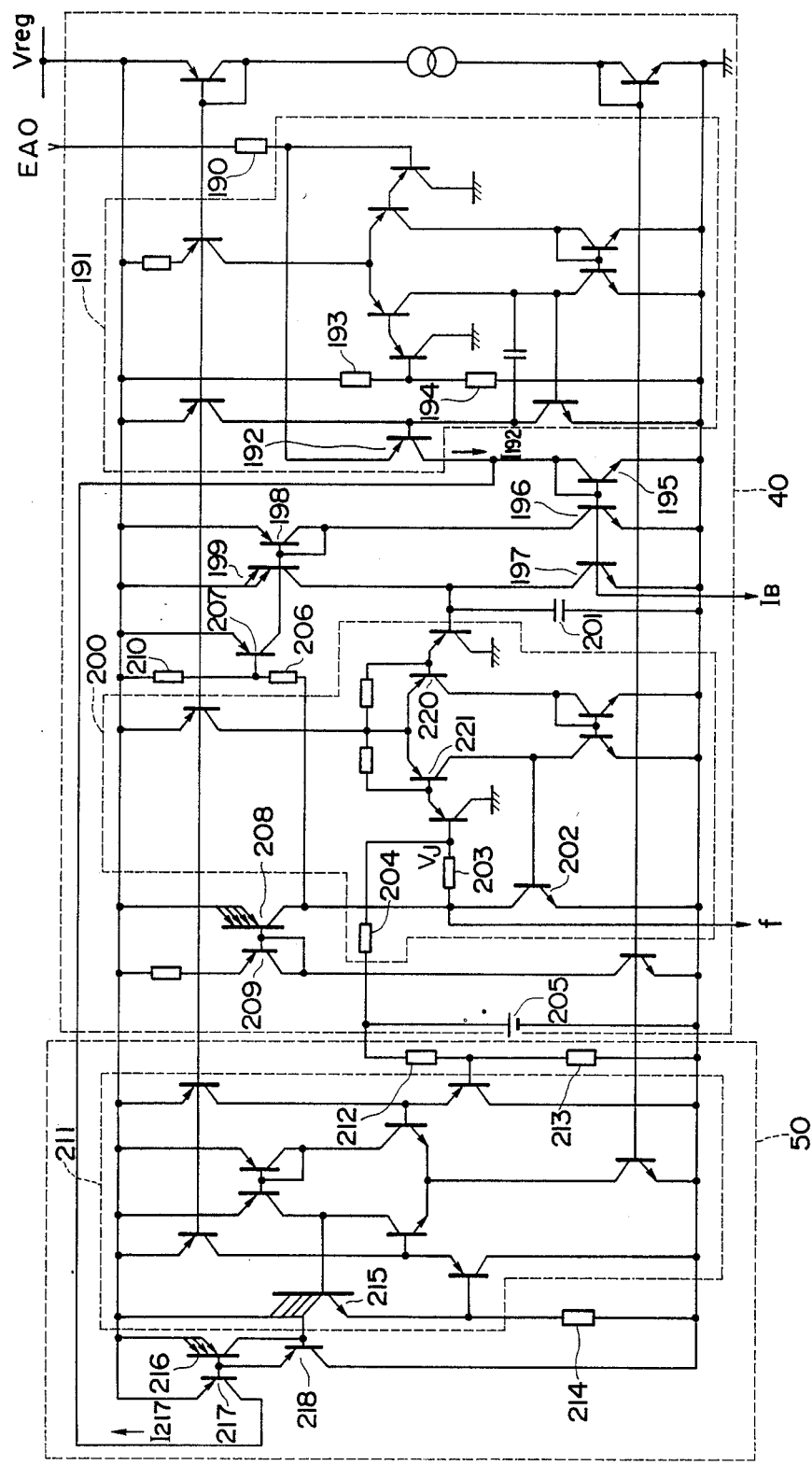
FIG. 5 it diagram showing the detailed structures of the voltage-controlled oscillator and the lowest frequency setting circuit shown in FIG. 1.

FIG. 5 shows, for example, preferred practical structures of the voltage-controlled oscillator 40 and the lowest frequency setting circuit 50.

Referring to FIG. 5, the output terminal of the error amplifier 30 generating the output signal EAO is connected to one input terminal of a differential amplifier 191 through a resistor 190 and also to the emitter of a transistor 192. A voltage dividing circuit consisting of resistors 193 and 194 is connected between a regulated voltage supply line and ground, and the voltage dividing point of the voltage dividing circuit is connected to the other input terminal of the differential amplifier 191. The error between the two inputs to the differential amplifier 191 is amplified to be applied to the base of the transistor 192. The transistor 192 is connected at its collector to the collector and base of a transistor 195. The transistor 195 is common-connected at its base to the bases of transistors 196 and 197 so as to generate the output signal $I_B$. Also, these transistors 195, 196 and 197 and grounded at their emitters to constitute a current mirror circuit. Transistors 198 and 199 having their emitters connected to the regulated voltage supply line are common-connected at their bases, and these bases are connected to the collector of the transistor 198 and to the collector of the transistor 196 respectively. The transistor 199 is connected at its collector to the collector of the transistor 197 and also to one input terminal of a comparator 200. A capacitor 201 is connected between ground and the said one input terminal of the comparator 200. The comparator 200 includes an output transistor 202, and a resistor 203 is connected between the collector of the output transistor 202 and the other input terminal of the comparator 200. The terminal of the resistor 203 on the side of the other input terminal of the comparator 200 is connected through a resistor 204 to a bias voltage source 205. The output transistor 202 is connected at its collector to the collector of a transistor 208 supplying a constant current and also to the base of a transistor 207 through a resistor 206. The transistor 207 is connected at its emitter to the regulated voltage supply line, at its base to its emitter through a resistor 210, and at its collector to the common connection point between the bases of the transistors 198 and 199.

The bias voltage of the bias voltage source 205 is divided by a voltage dividing circuit consisting of resistors 212 and 213, and the voltage dividing point of the voltage dividing circuit is connected to one input terminal of a differential amplifier 211. The differential amplifier 211 includes an output transistor 215 whose emitter is grounded through a resistor 214 and connected to the other input terminal of the differential amplifier 211. The output transistor 215 has a multicollector configuration and is connected at ¼ of its multiple collectors to the base of a transistor 218 having a grounded collector and also to the collector of a transistor 216. The transistor 216 is connected at its base to the base of a transistor 217 and also to the emitter of the transistor 218. The transistors 216 and 217 are connected at their emitters to the regulated voltage supply line. The transistor 217 is connected at its collector to the collector of the transistor 192.

The operation of the voltage-controlled oscillator 40 and the lowest frequency setting circuit 50 having the above-described structures will now be described.

In the error amplifier 30 shown in FIG. 1, the voltage dividing circuit consisting of the resistors 36 and 37 is connected between ground and the regulated voltage supply line supplying the voltage $V_{reg}$. Suppose now that these two resistors 36 and 37 have the same resistance value. In such a case, the voltage value of the output signal EAO appearing from the error amplifier 30 immediately after the main power supply switch is turned on is equal to $V_{reg}/2$. Suppose further that the resistors 193 and 194 connected to one of the input terminals of the differential amplifier 191 in the voltage-controlled oscillator 40 shown in FIG. 5 have the same resistance value. In this case, the value of the voltage applied to this input terminal of the differential amplifier 191 is equal to $V_{reg}/2$. Accordingly, the value of the voltage appearing at the connection point between the other input terminal of the differential amplifier 191 and the emitter of the transistor 192 is also equal to $V_{reg}/2$.

Therefore, no voltage drop occurs across the resistor 190 immediately after the main power supply switch is turned on. That is, no direct current is supplied to the transistor 192.

The function of the lowest frequency setting circuit 50 will now be described. Suppose now that $V_{205}$ is the value of the bias voltage of the bias voltage source 205, and $R_{212}$, $R_{213}$ and $R_{214}$ are the resistance values of the respective resistors 212, 213 and 214. Then, the value of the voltage applied to one input terminal of the differential amplifier 211 is equal to $$\frac{R_{213}}{R_{212} + R_{213}} \cdot V_{205}.$$

Since the condition for imaginary short holds between the two input terminals of the differential amplifier 211, the value of the voltage appearing at the connection point between the other input terminal of the differential amplifier 211 and the emitter of the transistor 215 is equal to the value of the voltage applied to the said one input terminal of the differential amplifier 211. That is, this voltage value is also equal to $$\frac{R_{213}}{R_{212} + R_{213}} \cdot V_{205}.$$

Therefore, the value of the emitter current of the transistor 215 is given by $$\frac{R_{213}}{R_{214}(R_{212} + R_{213})} \cdot V_{205}.$$

Because of the provision of the transistor 215 having the multicollector configuration together with the current mirror circuit composed of the transistors 216 and 217, a current value which is 1/12 of the emitter current of the transistor 215, that is, a collector current $I_{217}$ having a value given by $$\frac{R_{213}}{12 \cdot R_{214}(R_{212} + R_{213})} \cdot V_{205}$$

is supplied from the transistor 217 to the voltage-controlled oscillator 40 to set the lowest frequency of the output signal f of the voltage-controlled oscillator 40.

How to determine the oscillation frequency of the voltage-controlled oscillator 40 will now be explained. When the capacitor 201 connected between ground and one of the input terminals of the comparator 200 is not charged, a transistor 220 is in its on state, while a transistor 221 is in its off state. Under the above condition, the output transistor 202 of the comparator 200 is turned off thereby turning off the transistor 207. As a result, the current mirror circuit composed of the transistors 198 and 199 operates. Also, the current mirror circuit composed of the transistors 195, 196 and 197 operates on the basis of the current flowing through the transistor 195. Accordingly, the capacitor 201 is charged by the difference current between the collector current of the transistor 199 and the collector current of the transistor 197. When the emitter-collector saturation voltage of the transistor 208 is ignored, a voltage $V_J$ given by
$V_J = V_{205} +$ $$\frac{R_{204}}{R_{203} + R_{204}} \cdot (V_{reg} - V_{205})$$

is applied to the other input terminal of the comparator 200 at this time. In the above expression, $V_{reg}$ is the voltage supplied by the regulated power supply line, and $R_{203}$ and $R_{204}$ are the resistance values of the respective resistors 203 and 204.

As the capacitor 201 is progressively charged until the terminal voltage of the capacitor 201, that is, the voltage applied to the said one input terminal of the comparator 200 becomes higher than the voltage $V_J$, the output transistor 220 is turned off thereby turning on the transistor 221. As a result, the transistor 202 is turned on thereby turning on the transistor 207, and the current mirror circuit composed of the transistors 198 and 199 is turned off. Therefore, discharge of the capacitor 201 is started by the collector current of the transistor 197. When the emitter-collector saturation voltage of the transistor 202 is ignored, a voltage $V_J$ given by $$V_J = \frac{R_{203}}{R_{203} + R_{204}}.$$

is applied to the other input terminal of the comparator 200.

As the capacitor 201 is progressively discharged until the terminal voltage of the capacitor 201, that is, the voltage applied to the said one input terminal of the comparator 200 becomes lower than the voltage $V_J$, the output transistor 202 of the comparator 200 is now turned on, and charging of the capacitor 201 is started again. In the manner described above, the capacitor 201 is repeatedly charged and discharged, and an oscillation output waveform having a frequency corresponding to the repeated charge-discharge cycles is generated from the collector of the output transistor 202 of the comparator 200.

Because the magnitude of the voltages $V_J$ is constant, the oscillation frequency of the voltage-controlled oscillator 40 is determined by the value of the charge-discharge current of the capacitor 201. That is, when the value of the capacitor charge-discharge current is large, the terminal voltage of the capacitor 201 sharply rises and falls resulting in a high oscillation frequency, while when the value of the capacitor charge-discharge current is small, the oscillation frequency is low. The value of this capacitor charge-discharge current is determined by the value of the current supplied to the transistor 195. This value of the current supplied to the transistor 195 is the sum of the value of the collector current $I_{217}$ of the output transistor 217 in the lowest frequency setting circuit 50 and the value of the collector current $I_{192}$ of the output transistor 192 of the differential amplifier 191 in the voltage-controlled oscillator 40.

As described already, the value of the collector current $I_{192}$ of the output transistor 192 is zero immediately after the main power supply switch is turned on. At this time, the value of the current supplied to the transistor 195 is equal to the value of the current $I_{217}$ supplied from the lowest frequency setting circuit 50. Therefore, the voltage-controlled oscillator 40 starts to oscillate at the lowest oscillation frequency determined by the current $I_{217}$ supplied from the lowest frequency setting circuit 50. By suitably adjusting this lowest oscillation frequency so that the rotor of the brushless motor can sufficiently follow up the oscillator output signal, the brushless motor can be reliably started as a synchronous motor which operates in a relation synchronized with a frequency corresponding to the determined lowest oscillation frequency.

The lowest oscillation frequency can be adjusted as desired by making variable the resistance value of the resistor 214 thereby changing the value of the current $I_{217}$. When the motor starts to rotate, a counter-electromotive voltage is induced in each of the drive coils 1 to 3 of the motor. The phase error detector 20 shown in FIG. 1 detects, for each of the drive coils 1 to 3, the phase difference between the counter-electromotive voltage and the drive-coil energization switching signal during the drive-coil energization pause period, and the error amplifier 30 generates, as its output signal EAO, a d.c. voltage corresponding to the composite phase difference detected by the phase error detector 20. The d.c. voltage is applied to one of the terminals of the resistor 190, while the other terminal of the resistor 190 is maintained at the voltage level of $V_{reg}/2$, as described already. As a result, a current having a value corresponding to the voltage difference between the two terminals of the resistor 190 is supplied to the transistor 192. Therefore, the current having the value representing the sum of the value of the current $I_{217}$ supplied from the lowest frequency setting circuit 50 and that of the collector current $I_{192}$ of the transistor 192 is supplied to the transistor 195, thereby increasing the oscillation frequency of the voltage-controlled oscillator 40. Thus, in response to the detected composite phase difference between the counter-electromotive voltages induced in the drive coils 1 to 3 and the drive-coil energization switching signals, the level of the output signal EAO of the error amplifier 30 is incessantly changed so as to control the oscillation frequency of the voltage-controlled oscillator 40.

Figure 6:
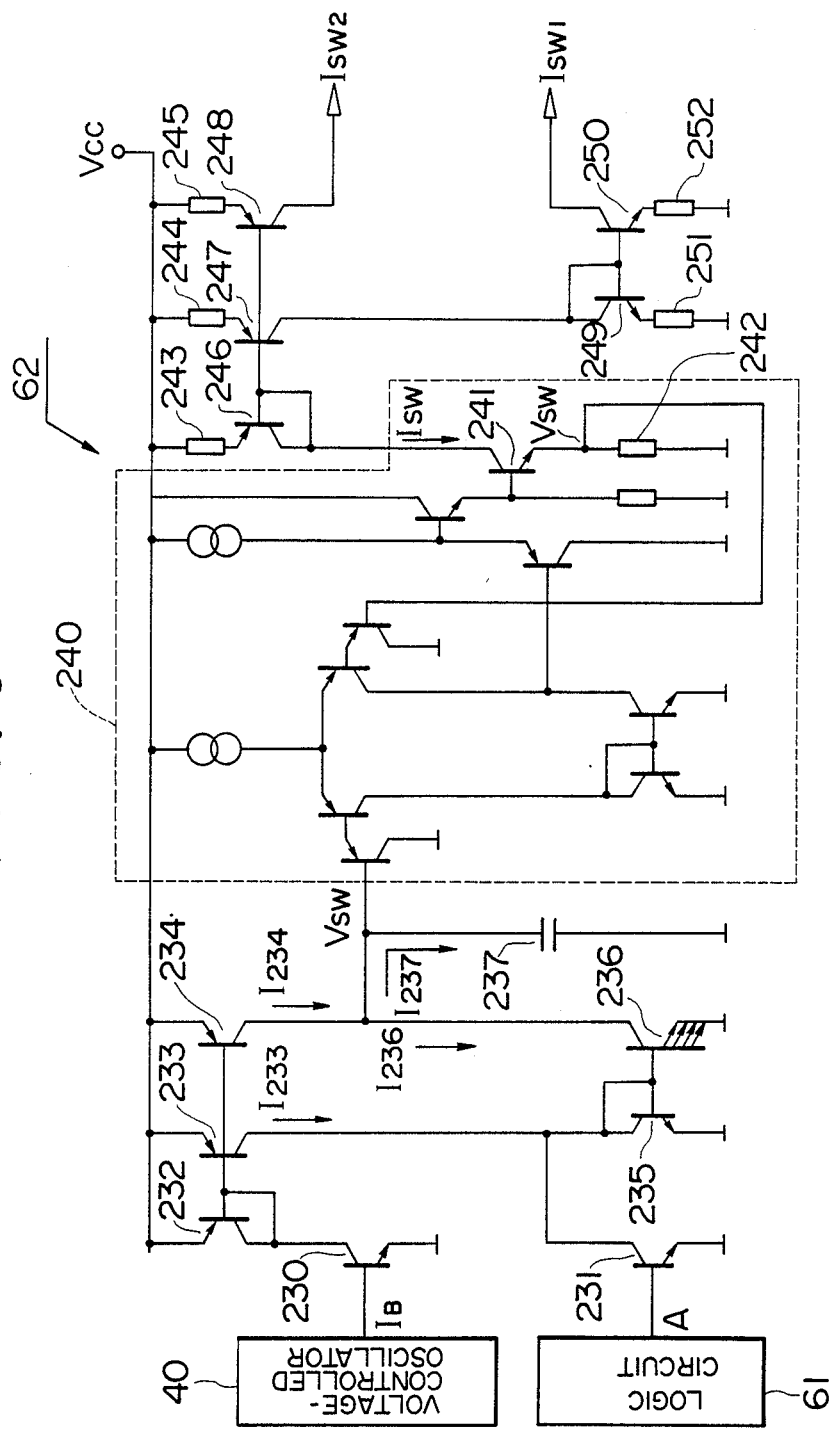
FIG. 6 is a circuit diagram showing the detailed structure of the slope generating circuit shown in FIG. 1.

FIG. 6 shows, for example, a preferred practical structure of the slope generating circuit 62. In FIG. 6, the voltage-controlled oscillator 40 and the logic circuit 61 are also shown.

Referring to FIG. 6, the output terminal of the voltage-controlled oscillator 40 generating the output signal $I_B$ is connected to the base of a transistor 230 which is grounded at its emitter. The output terminal of the logic circuit 61 generating the output signal A is connected to the base of a transistor 231 which is grounded at its emitter. The base of transistors 232, 233, 234 and the collector of the transistor 232 are common-connected and connected also to the collector of the transistor 230. The transistors 232, 233 and 234 are connected at their emitters to the power supply terminal supplying the voltage $V_{cc}$. The collector of the transistor 235 is common-connected to the bases of the transistor 235 and a transistor 236 and connected also to the collectors of the transistors 231 and 233. The emitter of the transistor 236 has an area four times as wide as that of the emitter of the transistor 235 and is grounded. The transistor 236 is connected at its collector to the collector of the transistor 234 and also to one input terminal of a differential amplifier 240. The collector of the transistor 236 is grounded through a capacitor 237.

The differential amplifier 240 includes an output transistor 241 whose emitter is grounded through a resistor 242. The collector and base of a transistor 246 are common-connected to the bases of transistors 247 and 248 and connected also to the collector of the output transistor 241 of the differential amplifier 240. The transistors 246, 247 and 248 are connected at their emitters to the power supply terminal $V_{cc}$ through resistors 243, 244 and 245 respectively. Transistors 249 and 250 are grounded at their emitters through resistors 251 and 252 respectively. The bases of these transistors 249, 250 and the collector of the transistor 249 are common-connected, and the transistor 249 is connected at its collector to the collector of the transistor 247. The collectors of the transistors 248 and 250 act as output terminals of the slope generating circuit 62, and current outputs $I_{SW2}$ and $I_{SW1}$ are generated from the collectors of these transistors 248 and 250 respectively.

Figure 7:
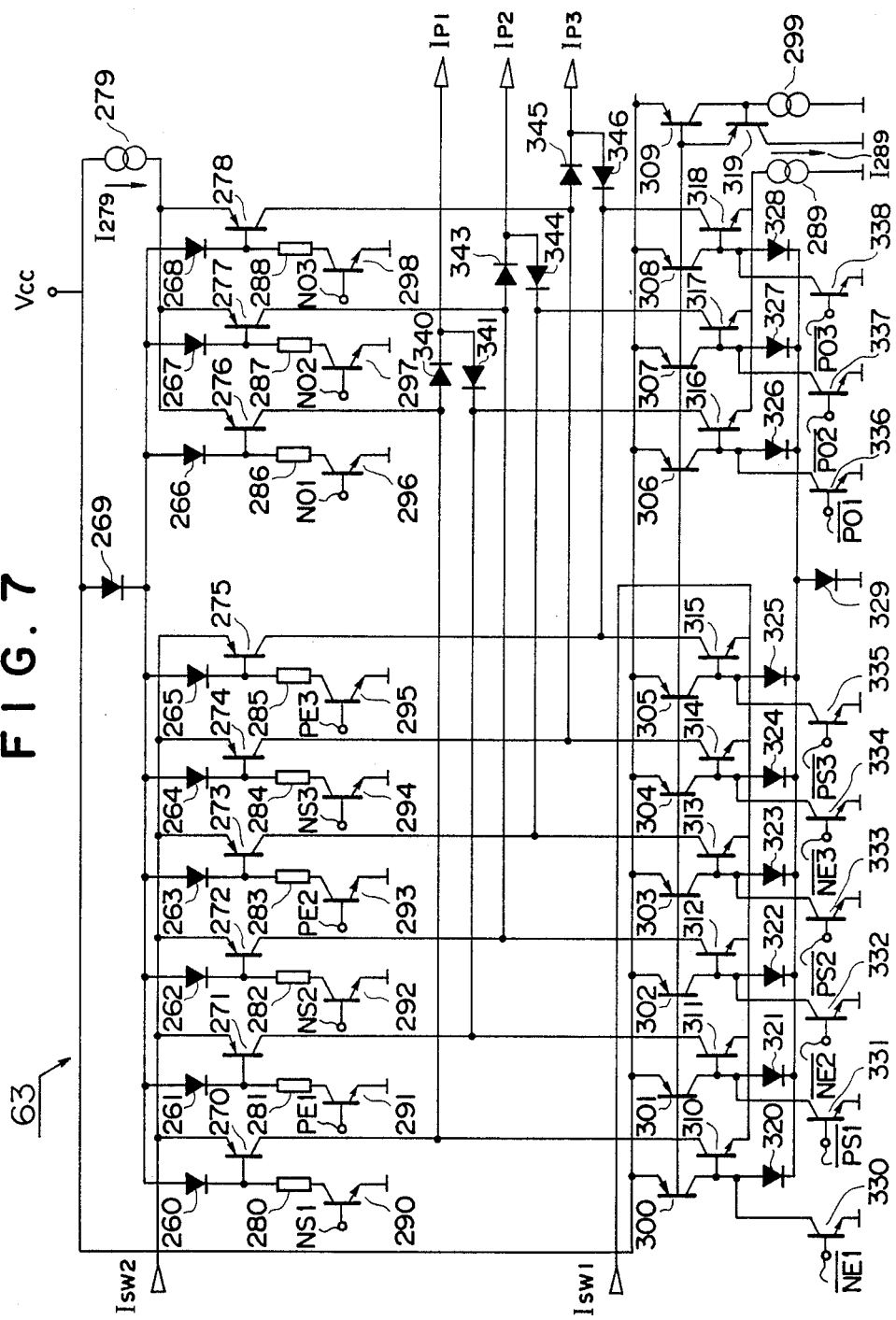
FIG. 7 is a circuit diagram showing the detailed structure of the slope synthesizing circuit shown in FIG. 1.

FIG. 7 shows, for example, a preferred practical structure of the slope synthesizing circuit 63.

Referring to FIG. 7, the current outputs $I_{SW1}$ and $I_{SW2}$ of the slope generating circuit 62 are supplied to the slope synthesizing circuit 63. Transistors 270, 271, 272, 273, 274 and 275 are common-connected at their emitters. Transistors 276, 277 and 278 common-connected at their emitters are connected through a constant current source 279 to the power supply terminal $V_{cc}$. The transistors 270, 271, 272, 273, 274, 275, 276, 277 and 278 are common-connected at their bases through diodes 260, 261, 262, 263, 264, 265, 266, 267 and 268 respectively, and these bases are connected through a diode 269 to the power supply terminal $V_{cc}$. Further, the bases of these transistors 270, 271, 272, 273, 274, 275, 276, 277 and 278 are connected through resistors 280, 281, 282, 283, 284, 285, 286, 287 and 288 to the collectors of transistors 290, 291, 292, 293, 294, 295, 296, 297 and 298 which are grounded at their emitters, respectively. Output signals NS1, PE1, NS2, PE2, NS3, PE3, NO1, NO2 and NO3 of the logic circuit 61 shown in FIG. 1 are applied to the bases of the transistors 290, 291, 292, 293, 294, 295, 296, 297 and 298 respectively. Transistors 300, 301, 302, 303, 304, 305, 306, 307, 308 and 309, which are common-connected at their bases, are connected at their emitters to the power supply terminal $V_{cc}$. The transistors 300, 301, 302, 303, 304, 305, 306, 307 and 308 are also common-connected at their collectors through diodes 320, 321, 322, 323, 324, 325, 326, 327 and 328 respectively, and these collectors are then grounded through a single diode 329.

The transistor 300 is connected at its collector to the base of the transistor 310 and to the collector of a transistor 330. Similarly, the transistor 301 is connected at its collector to the base of the transistor 311 and to the collector of a transistor 331, the transistor 302 is connected at its collector to the base of the transistor 312 and to the collector of a transistor 332, the transistor 303 is connected at its collector to the base of the transistor 313 and to the collector of a transistor 333, the transistor 304 is connected at its collector to the base of the transistor 314 and to the collector of a transistor 334, the transistor 305 is connected at its collector to the base of the transistor 315 and to the collector of a transistor 335, the transistor 306 is connected at its collector to the base of the transistor 316 and to the collector of a transistor 336, the transistor 307 is connected at its collector to the base of the transistor 317 and to the collector of a transistor 337, and the transistor 308 is connected at its collector to the base of the transistor 318 and to the collector of a transistor 338.

The transistors 330, 331, 332, 333, 334, 335, 336, 337 and 338 are grounded at their emitters, and output signals $\overline{NE1}$, $\overline{PS1}$, $\overline{NE2}$, $\overline{PS2}$, $\overline{NE3}$, $\overline{PS3}$, $\overline{PO1}$, $\overline{PO2}$ and $\overline{PO3}$ of the logic circuit 61 shown in FIG. 1 are applied to their bases respectively. The transistors 270, 310 and 276 are common-connected at their collectors to generate an output current $I_{P1}$ through a diode 340. The cathode of the diode 340 is connected through a diode 341 to the collectors of the transistors 271, 311 and 316. The transistors 272, 312 and 277 are common-connected at their collectors to generate an output current $I_{P2}$ through a diode 343. The cathode of the diode 343 is connected through a diode 344 to the collectors of the transistors 273, 313 and 317. Similarly, the transistors 274, 314 and 278 are common-connected at their collectors to generate an output current $I_{P3}$ through a diode 345. The cathode of the diode 345 is connected through a diode 346 to the collectors of the transistors 275, 315 and 318.

The transistors 276, 277 and 278 are common-connected at their emitters which are connected through the constant current source 279 to the power supply terminal $V_{cc}$. The transistors 316, 317 and 318 are common-connected at their emitters which are grounded through a constant current source 289. The transistor 309 is connected at its base to the emitter of the transistor 319 whose collector is grounded. The transistor 309 is connected at its collector to the base of the transistor 319 which is grounded at its base through a constant current source 299. The current output $I_{SW1}$ of the slope generating circuit 62 shown in FIGS. 1 and 6 is supplied to the emitters of the transistors 310 to 315, while the current output $I_{SW2}$ of the slope generating circuit 62 is supplied to the emitters of the transistors 270 to 275.

The operation of the slope generating circuit 62 and the slope synthesizing circuit 63 having the above-described structures will now be described.

Figure 8:
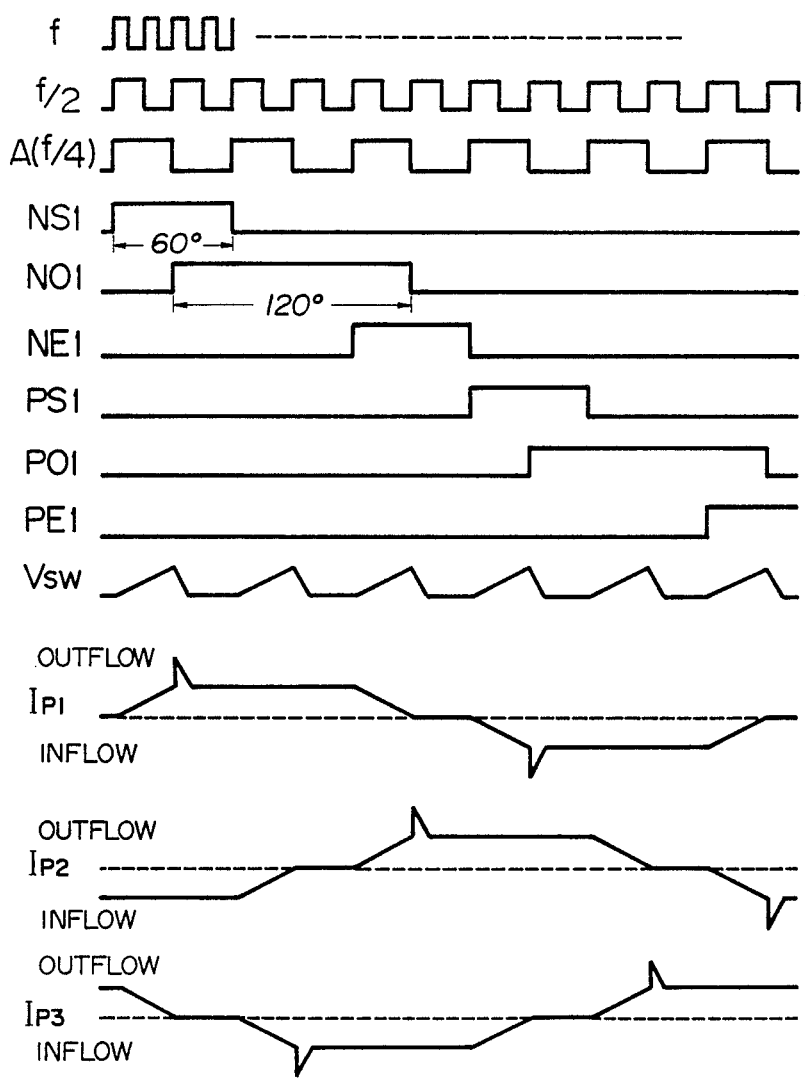
FIG. 8 illustrates the operation of the combination of the slope generating circuit and the slope synthesizing shown in FIGS. 6 and 7 respectively.

FIG. 8 illustrates the operation of the slope generating circuit 62 and the slope synthesizing circuit 63. That is, FIG. 8 shows operating waveforms appearing from various parts to generate the current outputs $I_{P1}$, $I_{P2}$ and $I_{P3}$ on the basis of which energization switching signals used for energizing the drive coils 1 to 3 are produced.

Referring to FIGS. 5 and 6 again, the transistor 230 constitutes the current mirro circuit together with the transistors 195, 196 and 197. A current equivalent to the charge-discharge current of the capacitor 201 constituting the essential part of the voltage-controlled oscillator 40 flows out from the collector of the transistor 230. Thus, the same current also flows out from the collectors of the transistors 232, 233 and 234 constituting the current mirror circuit.

When the output signal A of the logic circuit 61 is in its high level, the transistor 231 is turned on, while the transistors 235 and 236 are turned off. The capacitor 237 is charged with a current $I_{237}$ ($=I_{234}$), and the potential $V_{SW}$ of the capacitor 237 increases gradually. Then, when the output signal A of the logic circuit 61 is turned into its low level, the transistor 231 is turned off. As a result, a current $I_{233}$ is supplied to the transistor 235 constituting the current mirror circuit together with the transistor 236, while a current $I_{236}$ four times as large as the current $I_{233}$ is supplied to the transistor 236. Thus, the capacitor 237 is discharged with a discharge current which is equal to the difference ($I_{236}-I_{234}$), and the potential $V_{SW}$ decreases gradually. The differential amplifier 240 is a voltage follower in one sense, and, with the increase and decrease in the potential $V_{SW}$ of the capacitor 237, the potential difference across the output resistor 242 of the differential amplifier 240 changes accordingly. As a result, a corresponding output current $I_{SW}$ appears, and a current equivalent to the current $I_{SW}$ is supplied to the current mirror circuit composed of the transistors 246, 247 and 248 and to the current mirror circuit composed of the transistors 249 and 250. That is, an inflow current $I_{SW1}$ and an outflow current $I_{SW2}$ appear from the slop generating circuit 62.

Referring to FIGS. 7 and 8, the signals NS1 to NS3, $\overline{NE1}$ to $\overline{NE3}$, $\overline{PS1}$ to $\overline{PS3}$, NO1 to NO3, and $\overline{PO1}$ to $\overline{PO3}$ are required to synthesize the energization switching signals having the trapezoidal waveform. These signals are obtained by frequency division or logical processing of the output signal f of the voltage-controlled oscillator 40 by the logic circuit 61.

First, in FIG. 7, when the signal NS1 is turned into its high level, the transistors 290 and 270 are turned on, and, in response to the supply of the current $I_{SW2}$ corresponding to the voltage $V_{SW}$, the output current $I_{P1}$ is generated through the diode 340. Then, the signal N01 is turned into its high level thereby turning on the transistors 296 and 276, and the current $I_{279}$ supplied from the constant current source 279 is added to the current $I_{P1}$ through the diode 340. As soon as the signal N01 is turned into its high level, the current $I_{SW2}$ corresponding to the voltage $V_{SW}$ starts to decrease, and a horn-like projection is produced on the waveform of the current $I_{P1}$ as shown in FIG. 8. Then, before the voltage $V_{SW}$ starts to rise, the signal NS1 is turned into its low level thereby turning off the transistors 290 and 270, and only the current $I_{279}$ is generated as the output current $I_{P1}$.

Then, the signal $\overline{NE1}$ is turned into its low level thereby turning off the transistor 330 and turning on the transistor 310, and the output current $I_{P1}$ (=$I_{279}$) generated in response to the supply of the current $I_{SW1}$ corresponding to the voltage $V_{SW}$ is gradually decreased until the value of the current $I_{P1}$ becomes zero. Then, at the time when the signal $\overline{NE1}$ turns to high level, the signal $\overline{PS1}$ turns to low level, so that the transistors 330 and 310 are turned on and off respectively. Also, the transistors 331 and 311 are turned off and on respectively, and, in response to the supply of the current $I_{SW1}$ corresponding to the voltage $V_{SW}$, the current component of the output current $I_{P1}$ gradually increases in the inflowing direction. The signal $\overline{PO1}$ is then turned into its low level thereby turning off the transistor 336 and turning on the transistor 316, and the current $I_{289}$ supplied from the constant current source 289 is added through the diode 341 to increase the current component of the output current $I_{P1}$ in the inflowing direction. At the same time when the signal $\overline{PO1}$ is turned into its low level, the current $I_{SW1}$ corresponding to the voltage $V_{SW}$ starts to decrease, and a horn-like projection similar to that produced in the outflowing case is also produced on the waveform of the output current $I_{P1}$. Before the voltage $V_{SW}$ starts to rise, the signal $\overline{PS1}$ is turned into its high level thereby turning on the transistor 331 and turning off the transistor 311, and only the current $I_{289}$ forms the output current $I_{P1}$.

Then, the signal PE1 is turned into its high level thereby turning on the transistors 291 and 271, and the output current $I_{P1}$ (=$I_{289}$) generated through the diode 341 in response to the supply of the current $I_{SW2}$ corresponding to the voltage $V_{SW}$ gradually decreases until the value of the current $I_{P1}$ becomes zero. Then, the signal PE1 is turned into its low level thereby turning off the transistors 291 and 271, and, at the same time, the signal NS1 is turned into its high level. Thereafter, the sequence described above is repeated to provide the output current $I_{P1}$ of the slope synthesizing circuit 63.

It is apparent that the output currents $I_{P2}$ and $I_{P3}$ are similarly provided.

It will thus be seen that, in the slope generating circuit 62 employed in the illustrated embodiment, the output signal of the voltage-controlled oscillator 40 is used to form the triangular waveform currents and to determine the timing of generation thereof, in the same way as the energization switching signals which are based on the output signal f of the voltage-controlled oscillator 40. Therefore, a variation in the motor rotation speed is immediately followed by corresponding variations in the gradient and duration of the slope portions of the energization switching signal waveforms, so that the so-called slope control for providing optimized slope portions can be achieved.

Figure 9:
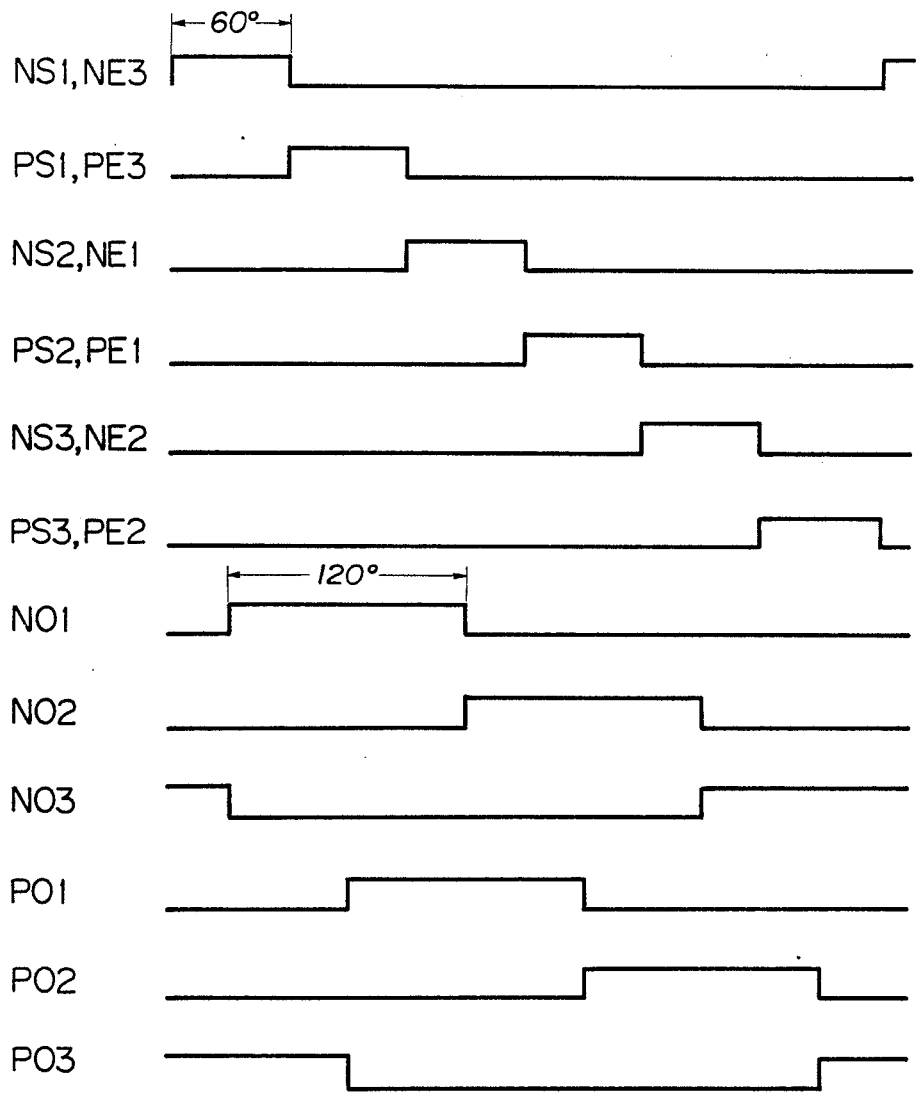
FIG. 9 shows the phase relation between the input signals applied to the slope synthesizing circuit shown in FIG. 7.

FIG. 9 shows the phase relation between the signals required for the slope synthesization according to the present invention.

Figure 10:
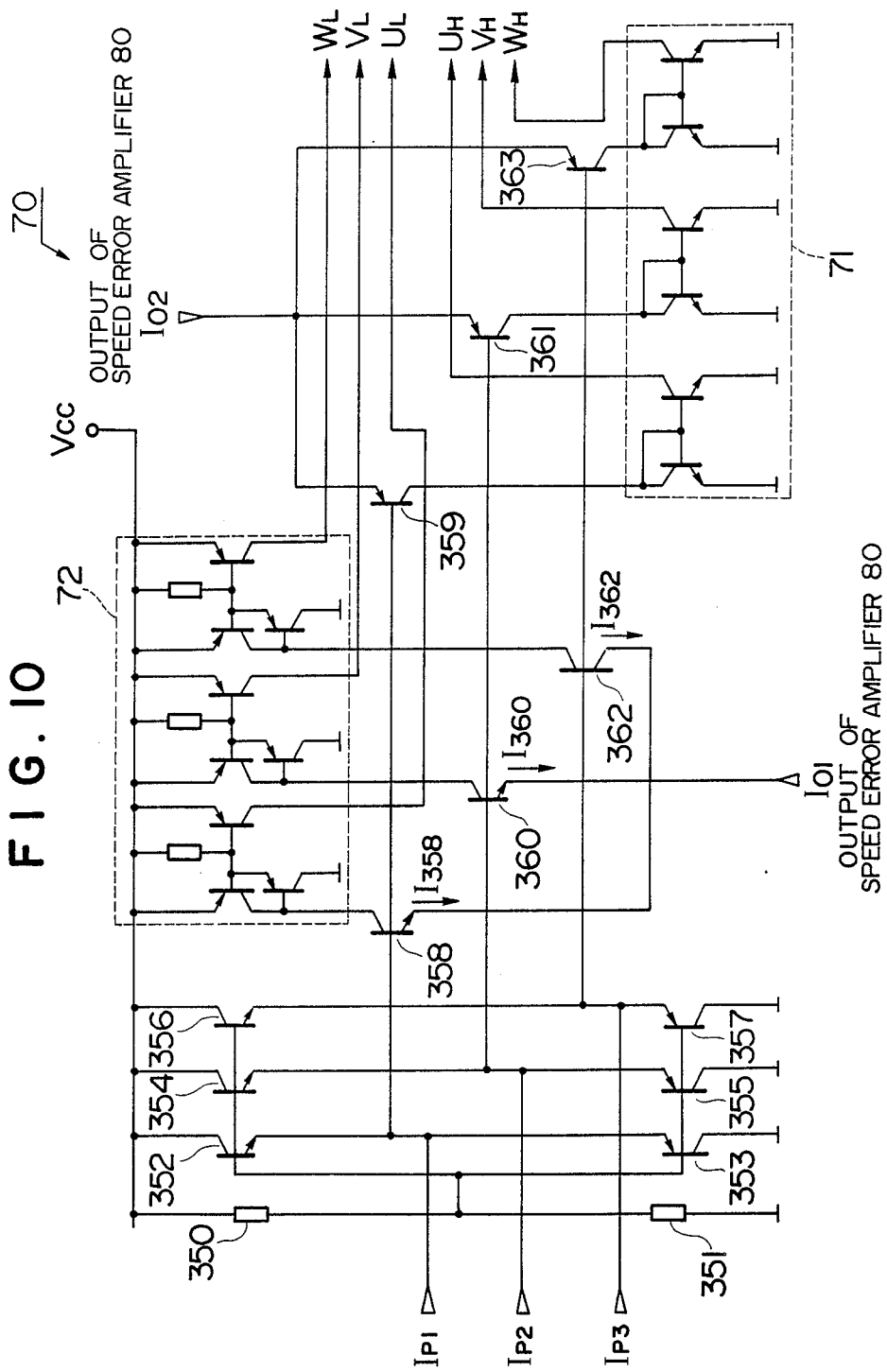
FIG. 10 is a circuit diagram showing the detailed the distribution circuit shown in FIG. 1.

FIG. 10 shows, for example, a preferred practical structure of the distribution circuit 70.

Referring to FIG. 10, transistors 352, 354 and 356 are connected at their collectors to the power supply terminal $V_{cc}$, while transistors 353, 355 and 357 are grounded at their collectors. The bases of all of these transistors 352 to 357 are common-connected, and a voltage dividing point of a voltage dividing circuit consisting of resistors 350 and 351 connected between $V_{cc}$ and ground is connected to the common connection point of the transistors 352 to 357. The transistors 352 and 353 are common-connected at their emitters to the bases of transistors 358 and 359 to which the output current $I_{P1}$ of the slope synthesizing circuit 63 is supplied. The transistors 354 and 355 are common-connected at their emitters to the bases of transistors 360 and 361 to which the output current $I_{P2}$ of the slope synthesizing circuit 63 is supplied. Similarly, the transistors 356 and 357 are common-connected at their emitters to the bases of transistors 362 and 363 to which the output current $I_{P3}$ of the slope synthesizing circuit 63 is supplied.

The transistors 358, 360 and 362 are common-connected at their emitters, and the output current $I_{01}$ of the speed error amplifier 80 is supplied to the common connection point of these transistors. The collector outputs of these transistors 358, 360 and 362 are applied to the amplifier 72 to generate the energization switching signals $U_L$, $V_L$ and $W_L$ respectively. Also, the transistors 359, 361 and 363 are common-connected at their emitters, and the output current $I_{02}$ of the speed error amplifier 80 is supplied to the common connection point of these transistors. The collector outputs of these transistors 359, 361 and 363 are applied to the amplifier 71 to generate the energization switching signals $U_H$, $V_H$ and $W_H$ respectively.

The operation of the distribution circuit 70 having the above-described structure will now be described.

As described already, the voltage dividing circuit consisting of the resistors 350 and 351 is connected between $V_{cc}$ and ground. Suppose that these resistors 350 and 351 have the same resistance value. Then, the common connection point of the transistors 352 to 357 common-connected at their bases is biased by the voltage which is equal to $V_{cc}/2$. The output currents $I_{01}$ and $I_{02}$ of the speed error amplifier 80 are such that errors between the currents of the drive coils 1 to 3 and the torque command signal ET are amplified to provide corresponding current signals.

Figure 11:
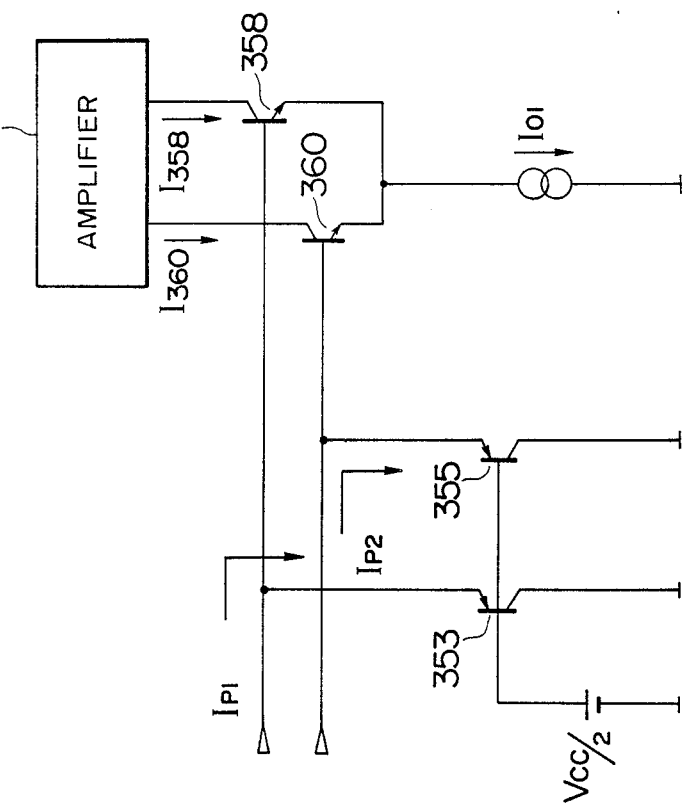
FIG. 11 is partial equivalent circuit diagram of the distribution circuit shown in FIG. 10.
Figure 12:
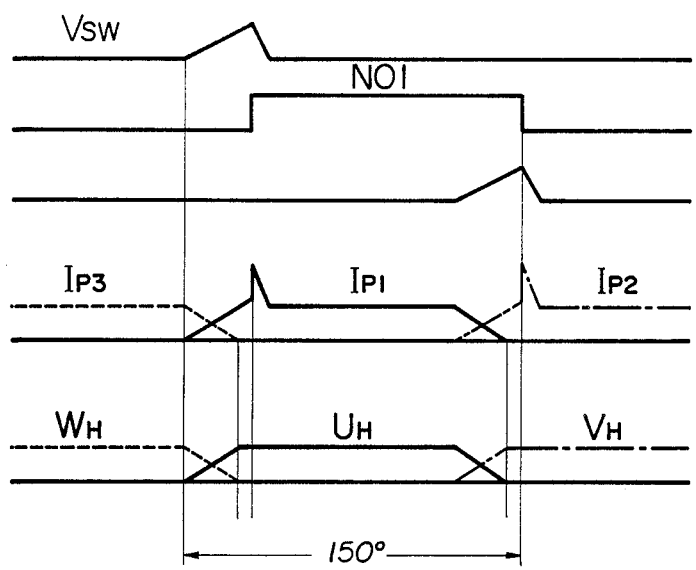
FIG. 12 illustrates the operation of the distribution circuit shown in FIGS. 10 and 11.

FIG. 11 is a partial equivalent circuit diagram of the distribution circuit 70 when the current outputs $I_{P1}$ and $I_{P2}$ of the slope synthesizing circuit 63 are source currents. FIG. 12 illustrates the operation of the distribution circuit 70 to show how the current outputs $I_{P1}$ and $I_{P2}$ (or $I_{P3}$) of the slope synthesizing circuit 63 are changed over.

Referring to FIG. 11, the relation of $I_{358}=I_{01}$ holds when the value of $I_{P2}$ is equal to zero, and the following equations (1) to (4) hold at the time of change-over between the current outputs $I_{P1}$ and $I_{P2}$ of the slope synthesizing circuit 63:

$$V_{BE353} = \frac{KT}{q} \ln \frac{I_{P1}}{I_{S1}} \tag{1}$$

$$V_{BE355} = \frac{KT}{q} \ln \frac{I_{P2}}{I_{S1}} \tag{2}$$

$$V_{BE358} = \frac{KT}{q} \ln \frac{I_{358}}{I_{S2}} \tag{3}$$

$$V_{BE360} = \frac{KT}{q} \ln \frac{I_{360}}{I_{S2}} \tag{4}$$

where $V_{BE353}$, $V_{BE355}$, $V_{BE358}$, $V_{BE360}$ are the base-emitter potentials of the respective transistors 353, 355, 358, 360, K is the Boltzmann's constant, T is the absolute temperature, q is the electron charges, and $I_{S1}$, $I_{S2}$ are saturation currents of the transistors 353, 355 and transistors 358, 360 respectively. Since $V_{BE353}-V_{BE355}=V_{BE358}-V_{BE360}$, the following equation (5) is derived from the equations (1), (2), (3) and (4):

$$\frac{I_{P1}}{I_{P2}} = \frac{I_{358}}{I_{360}} \tag{5}$$

Also, the following equation (6) holds:

$$I_{358}+I_{360}=I_{01} \tag{6}$$

It can be seen from the equation (5) that, when the current output $I_{P1}$ is gradually changed over to the current output $I_{P2}$, the current $I_{358}$ is also changed over to the current $I_{360}$ at the same change-over rate as that between $I_{P1}$ and $I_{P2}$. It can also be seen from the equation (6) that, when the value of $I_{P1}$ becomes zero in FIG. 12 before a horn-like projection is produced on the waveform of $I_{P2}$, the waveform of the energization switching signal $U_H$ is entirely free from any adverse effect attributable to the presence of the horn-like projection on the current waveform. The same applies also to the change-over between the phases other than that between $I_{P1}$ and $I_{P2}$.

It will be seen from the above description of the preferred embodiment that the energization switching signals $U_H$, $V_H$, $W_H$, $U_L$, $V_L$ and $W_L$ having the trapezoidal waveforms and having their slope portions synthesized on the basis of the output signal of the voltage-controlled oscillator 40 are used so as to energize the drive coils 1 to 3 of the brushless motor. The so-called phase control loop (PLL loop) is provided in which the phase difference between each of the drive-coil energization signal waveforms and the counter-electromotive voltage induced in each of the drive coils 1 to 3 is detected by the phase error detector 20, and the output signal of the phase error detector 20 is applied, after amplification, to the voltage-controlled oscillator 40 so as to control the oscillation frequency and phase of the output signal of the voltage-controlled oscillator 40 until the detected phase error is cancelled. Therefore, the brushless motor can be efficiently driven without being adversely affected by the armature reaction and at a minimized level of electromagnetic noise. Further, the filter circuit required hitherto need not be provided, and the number of large-capacity capacitors can be greatly decreased. Further, because the phase error is detected in the energization pause period, the system operation is free from the voltage drop attributable to the flow of energization current during the energization period and the impedance of the drive coils as well as power supply voltage variations and load variations. Furthermore, the width of the phase error detection output pulses generated during the energization pause period is fixed relative to the electrical angle or mechanical angle of the rotor of the motor, and the phase error depends only on the duty factor of the comparison output obtained by comparing the neutral voltage with the counter-electromotive voltage induced in each of the drive coils in the period in which the phase error detection output pulses are generated. Therefore, no change occurs in the phase error detection gain due to the rotation speed of the brushless motor, and the phase control loop can continuously stably operate.

It will be understood from the foregoing detailed description of the present invention that the energization switching signals having the trapezoidal waveform based on the output signal of the voltage-controlled oscillator are used so as to energize the drive coils of the brushless motor. The so-called phase control loop is provided in which the phase difference between each of the drive-coil energization signal waveforms and the counter-electromotive voltage induced in each of the drive coils is detected by the phase error detector, and, after amplification of the detected phase error signal by the error amplifier, the phase error signal is applied to the voltage-controlled oscillator so as to control the frequency and phase of the output signal of the voltage-controlled oscillator. Therefore, the filter circuit required hitherto need not be provided, and, therefore, the number of large-capacity capacitors can be greatly decreased. Further, the brushless motor can operate without the prior art problems including the voltage drop attributable to the energization current flow and the impedance of the drive coils, power supply voltage variations and load variations, and the reduced efficiency due to the armature reaction. Further, the lowest frequency setting circuit is provided so that the oscillation frequency of the voltage-controlled oscillator can be set at its lowest oscillation frequency at the time immediately after the main power supply switch is turned on, and so that the rotating magnetic field having the velocity which can be easily followed up by the rotor of the motor can be produced. Therefore, the brushless motor can be reliably started, and, after starting, the slope portions of the energization switching signals used for energizing the drive coils can be suitably controlled, so that the motor can be efficiently driven at a minimized level of electromagnetic noise. Further, by using essential parts of the system to form integrated circuits which require a very small number of externally mounted parts, an inexpensive brushless motor drive system having very excellent operating characteristics can be realized.

The aforementioned embodiment of the present invention has referred to the application of the present invention to a brushless motor drive system of a three-phase full-wave drive type. However, it is apparent that the present invention is similarly applicable to a brushless motor drive system of, for example, a three-phase half-wave drive type, a two-phase full-wave drive type or a two-phase half-wave drive type.

We claim:

1. A system for driving a brushless motor comprising:
   motor drive coils belonging to a plurality of phases respectively;
   a plurality of pairs of drive transistors connected to said drive coils respectively;
   a distribution circuit for sequentially distributing drive-coil energization switching signals to said plural drive transistors respectively;
   a slope synthesizer for smoothing leading and trailing slope portions of said drive-coil energization switching signals so as to apply the smoothed energization switching signals to said drive transistors respectively through said distribution circuit;
   a voltage-controlled oscillator for supplying a signal having a suitable frequency as an input to said slope synthesizer;
   a phase error detector for detecting the phase difference between counter-electromotive voltages induced in said drive coils and said drive-coil energization switching signals in a drive-coil energization pause period; and
   an error amplifier for amplifying the output signal of said phase error detector and applying the amplified phase error signal as an input to said voltage-controlled oscillator.

2. A brushless motor drive system according to claim 1, wherein said slope synthesizer includes a logic circuit generating, on the basis of the output signal of said voltage-controlled oscillator, a plurality of pulse signals required for synthesizing the slope portions of said drive-coil energization switching signals, a slope generating circuit generating, in response to the application of an output signal of said logic circuit, its output signals for defining slope waveforms having a frequency proportional to that of the output signal of said voltage-controlled oscillator, and a slope synthesizing circuit synthesizing the output signals of said slope generating circuit to form the energization switching signals having a trapezoidal waveform according to the output pulse signals of said logic circuit.

* * * * *